(12) United States Patent
Uresti

(10) Patent No.: US 8,622,789 B1
(45) Date of Patent: Jan. 7, 2014

(54) SEAFOOD MEAT EXTRACTION TOOL

(71) Applicant: Reynaldo Uresti, Santa Rosa, CA (US)

(72) Inventor: Reynaldo Uresti, Santa Rosa, CA (US)

(*) Notice: Subject to any disclaimer, the term of this patent is extended or adjusted under 35 U.S.C. 154(b) by 0 days.

(21) Appl. No.: 13/764,915

(22) Filed: Feb. 12, 2013

(51) Int. Cl.
*A22C 29/02* (2006.01)

(52) U.S. Cl.
USPC .......................................... 452/6

(58) Field of Classification Search
USPC ............. 452/1–6, 102–105, 9, 12, 13, 17, 7
See application file for complete search history.

(56) References Cited

U.S. PATENT DOCUMENTS

| | | | | |
|---|---|---|---|---|
| 3,353,207 A | * | 11/1967 | Weinberger | 452/3 |
| 3,414,935 A | * | 12/1968 | Senna | 452/103 |
| 4,524,490 A | | 6/1985 | Newville | |
| 4,815,460 A | | 3/1989 | Porat | |
| 4,967,446 A | * | 11/1990 | Padel | 452/3 |
| 5,613,904 A | * | 3/1997 | LaSalle et al. | 452/6 |
| 5,800,256 A | * | 9/1998 | Bermudez | 452/6 |
| 6,129,622 A | * | 10/2000 | Seaman et al. | 452/6 |
| 7,024,777 B1 | * | 4/2006 | Bach | 30/120.1 |
| 7,112,129 B2 | * | 9/2006 | Zimbone et al. | 452/6 |
| 7,121,939 B1 | * | 10/2006 | Quaglino | 452/6 |
| 7,125,329 B2 | * | 10/2006 | Mindes | 452/3 |
| 7,134,206 B2 | * | 11/2006 | Bach | 30/120.1 |

* cited by examiner

*Primary Examiner* — Richard Price, Jr.

(57) ABSTRACT

The seafood meat extraction tool includes a pair of narrow and elongated tongs with pointed members on distal ends of each tong. The pointed members each include a plurality of raised grip protuberances thereon, which are oriented inwardly and thus face one another. The pointed members are adapted for use in insertion into a crab leg in order for the raised grip protuberances to be squeezed on opposing sides for gripping of meat contained therein, and which is pulled therefrom via a handle member. The elongated tongs are further defined with an outer surface that is adorned with a non-slip member thereon for use in manually gripping the tool. The elongated tongs connect to form an acute angle being named a juncture from which the handle member extends rearwardly therefrom.

2 Claims, 5 Drawing Sheets

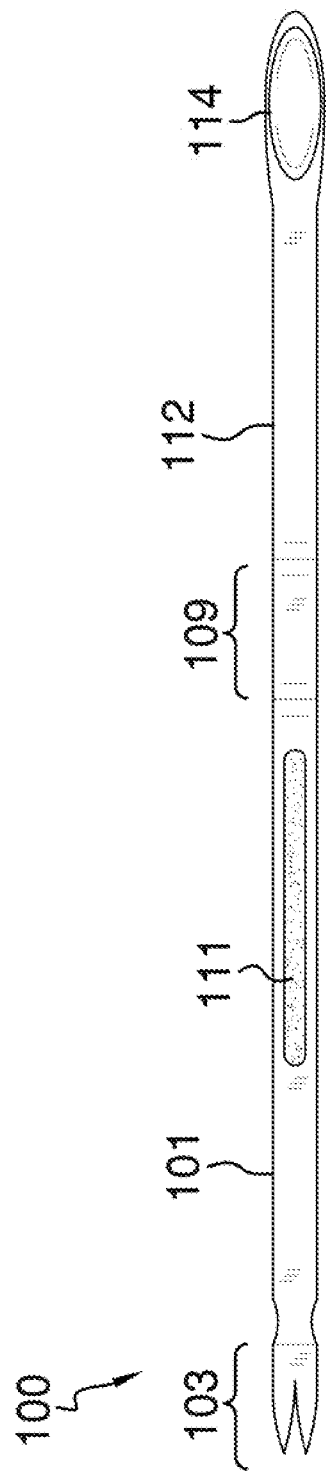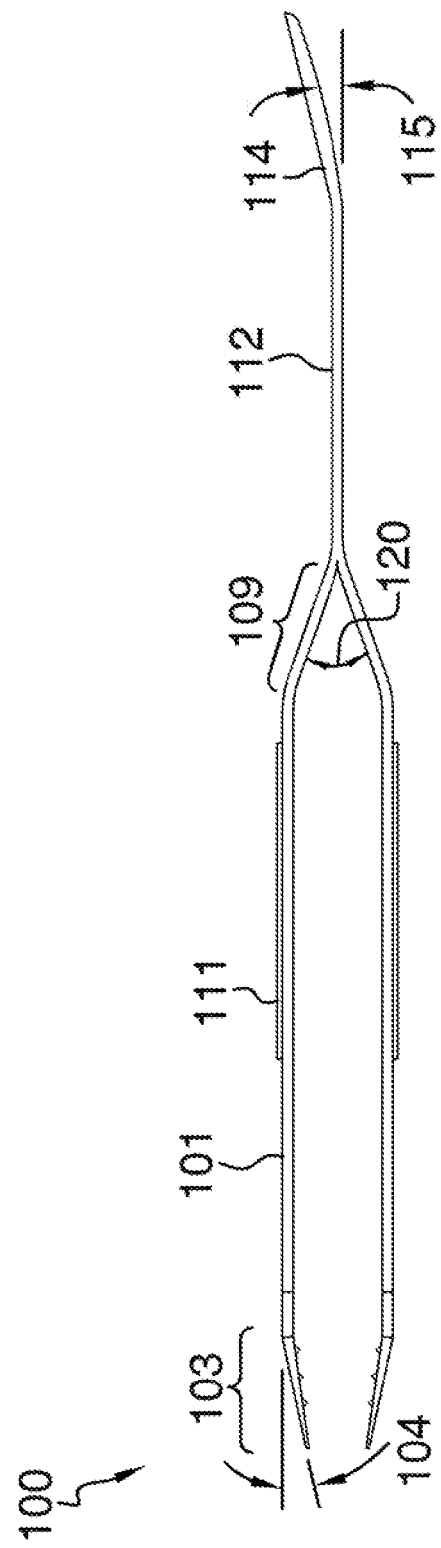

SEAFOOD MEAT EXTRACTION TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of food utensils, more specifically, a hand tool that is specially adapted for use in extracting meat from inside of seafood, and more specifically, hard-shelled seafood.

B. Discussion of the Prior Art

As will be discussed immediately below, no prior art discloses a seafood meat extraction tool that includes a pair of narrow and elongated tongs with pointed members on distal ends of each tong; wherein the pointed members each include a plurality of raised grip protuberances thereon, which are oriented inwardly and thus face one another; wherein the pointed members are adapted for use in insertion into a crab leg in order for the raised grip protuberances to be squeezed on opposing sides for gripping of meat contained therein, and which is pulled therefrom via a handle member; wherein the elongated tongs are further defined with an outer surface that is adorned with a non-slip member thereon for use in manually gripping the tool; wherein the elongated tongs connect to form an acute angle being named a juncture from which the handle member extends rearwardly therefrom; wherein the juncture forms a biasing force that maintains the elongated tongs generally parallel with one another; wherein the handle member includes a pry member on a distal end, which is useful in prying open a clam or like shelled piece of seafood.

The Porat et al. (U.S. Pat. No. 4,815,460) discloses gripper teeth on one part of a medical instrument, such as foreceps, which are symmetrically arranged.

The Newville (U.S. Pat. No. 4,524,490) discloses a handheld tool for removing the meat from a crawfish tail having a handle adapted to the human hand containing a pair of spring biased opposed elongated concave tongs with curved inward tips.

The Bermudez (U.S. Pat. No. 5,800,256) illustrates a tool and method for picking crab that includes a long-narrow and strong forceps that is especially adapted to be inserted into cavities within the shell for tearing the shell and picking out the crab meat.

While the above-described devices fulfill their respective and particular objects and requirements, they do not describe a seafood meat extraction tool that includes a pair of narrow and elongated tongs with pointed members on distal ends of each tong; wherein the pointed members each include a plurality of raised grip protuberances thereon, which are oriented inwardly and thus face one another; wherein the pointed members are adapted for use in insertion into a crab leg in order for the raised grip protuberances to be squeezed on opposing sides for gripping of meat contained therein, and which is pulled therefrom via a handle member; wherein the elongated tongs are further defined with an outer surface that is adorned with a non-slip member thereon for use in manually gripping the tool; wherein the elongated tongs connect to form an acute angle being named a juncture from which the handle member extends rearwardly therefrom; wherein the juncture forms a biasing force that maintains the elongated tongs generally parallel with one another; wherein the handle member includes a pry member on a distal end, which is useful in prying open a clam or like shelled piece of seafood. In this regard, the seafood meat extraction tool departs from the conventional concepts and designs of the prior art.

SUMMARY OF THE INVENTION

The seafood meat extraction tool includes a pair of narrow and elongated tongs with pointed members on distal ends of each tong. The pointed members each include a plurality of raised grip protuberances thereon, which are oriented inwardly and thus face one another. The pointed members are adapted for use in insertion into a crab leg in order for the raised grip protuberances to be squeezed on opposing sides for gripping of meat contained therein, and which is pulled therefrom via a handle member. The elongated tongs are further defined with an outer surface that is adorned with a non-slip member thereon for use in manually gripping the tool. The elongated tongs connect to form an acute angle being named a juncture from which the handle member extends rearwardly therefrom. The juncture forms a biasing force that maintains the elongated tongs generally parallel with one another. The handle member includes a pry member on a distal end, which is useful in prying open a clam or like shelled piece of seafood in order for the pointed members to subsequently grab and remove the meat therefrom.

It is an object of the invention to provide a device that is able to pry open hard-shelled seafood, and which includes a pair of elongated tongs that are able to slide down into a crab leg in order to grip meat contained therein.

A further object of the invention is to provide a seafood meat extraction tool wherein the distal ends of the elongated tongs include pointed members that can be used to skewer meat thereon.

An even further object of the invention is to provide pointed members that each includes a plurality of raised grip protuberances thereon, which are oriented inwardly and thus face one another, and which are ideal for gripping crab meat from inside of the shell.

A further object of the invention is to provide the elongated tongs with an outer surface that is adorned with a non-slip member thereon for use in manually gripping the tool.

These together with additional objects, features and advantages of the seafood meat extraction tool will be readily apparent to those of ordinary skill in the art upon reading the following detailed description of presently preferred, but nonetheless illustrative, embodiments of the seafood meat extraction tool when taken in conjunction with the accompanying drawings.

In this respect, before explaining the current embodiments of the seafood meat extraction tool in detail, it is to be understood that the seafood meat extraction tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the seafood meat extraction tool.

It is therefore important that the claims be regarded as including such equivalent construction insofar as they do not depart from the spirit and scope of the seafood meat extraction tool. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a top view of the seafood meat extraction tool, and detailing the thin profile;

FIG. 3 illustrates a front view of the seafood meat extraction tool;

DETAILED DESCRIPTION OF THE EMBODIMENT

Figure 1:
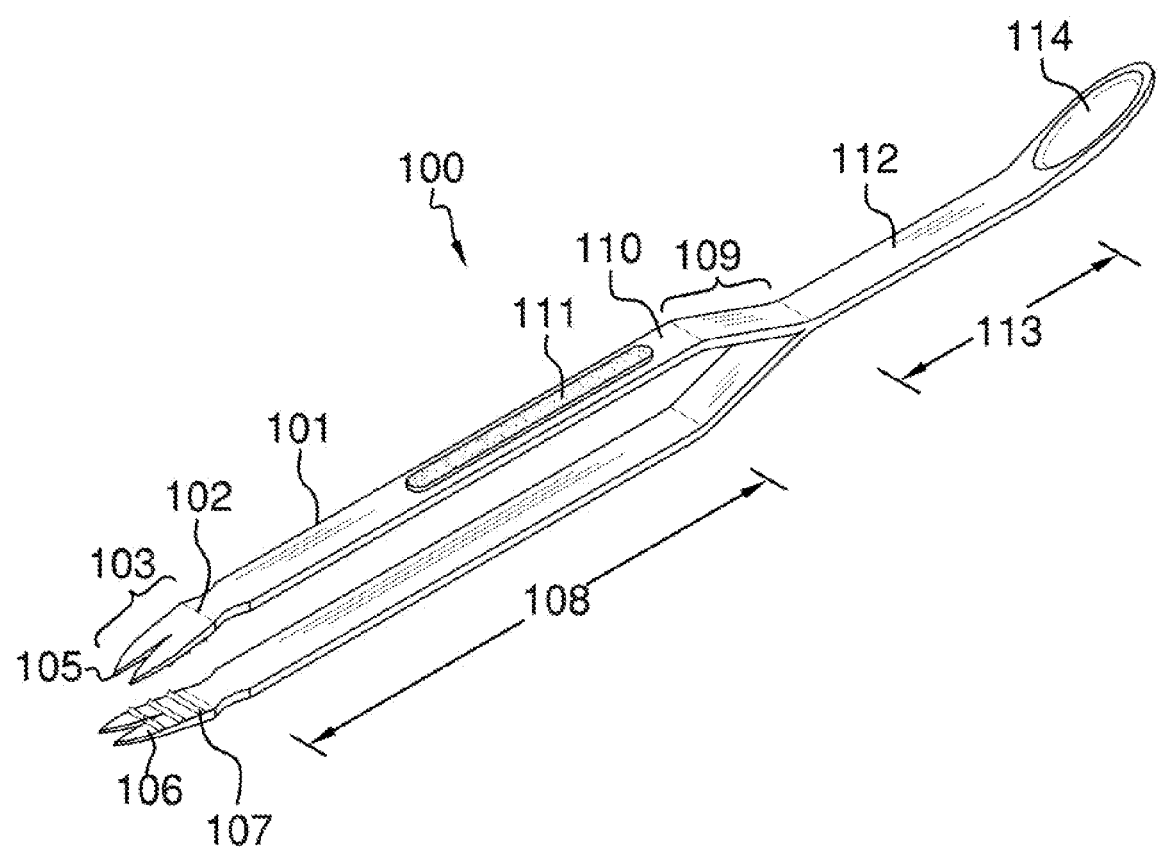
FIG. 1 illustrates a perspective view of the seafood meat extraction tool.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A seafood meat extraction tool 100 (hereinafter invention) includes a pair of elongated tongs 101 that are of equal size and shape, and which are generally parallel with one another. The elongated tongs 101 are further defined with a distal end 102 at which a pointed member 103 extends inwardly at an angle 104. The pointed member 103 includes at least one sharpened point 105 that is ideal for skewering meat 200 thereon. The pointed member 103 is further defined with an inner surface 106 that is adorned with at least one raised protuberance 107. The raised protuberances 107 of the pointed members 103 face one another such that when in use, the raised protuberances 107 add gripping value to the invention 100.

The elongated tongs 101 have a tong length 108, and connect at a juncture 109. The juncture 109 forms a biasing force between the elongated tongs 101 such that the elongated tongs 101 may be bent towards one another in order for the pointed members 103 to either touch one another or grip or skewer meat 200 thereon. The elongated tongs 101 are further defined with an outer surface 110 that is provided with a non-slip member 111 that provides a means with which to grab and manipulate the invention 100 manually.

The invention 100 includes a handle member 112 that extends rearwardly from the juncture 109 such that the elongated tongs 101 extend forwardly. The juncture 109 forms a "Y" shape between the elongated tongs 101 and the handle member 112. The juncture 109 forms an acute juncture angle 120 with respect to the elongated tongs 101 and the handle member 112. The handle member 112 is of an undefined length 113, and has the same width as the elongated tongs 101. The handle member 112 includes a pry member 114 that is opposite of the juncture 109. The pry member 114 forms a pry angle 115 with respect to the handle member 112.

Figure 4:
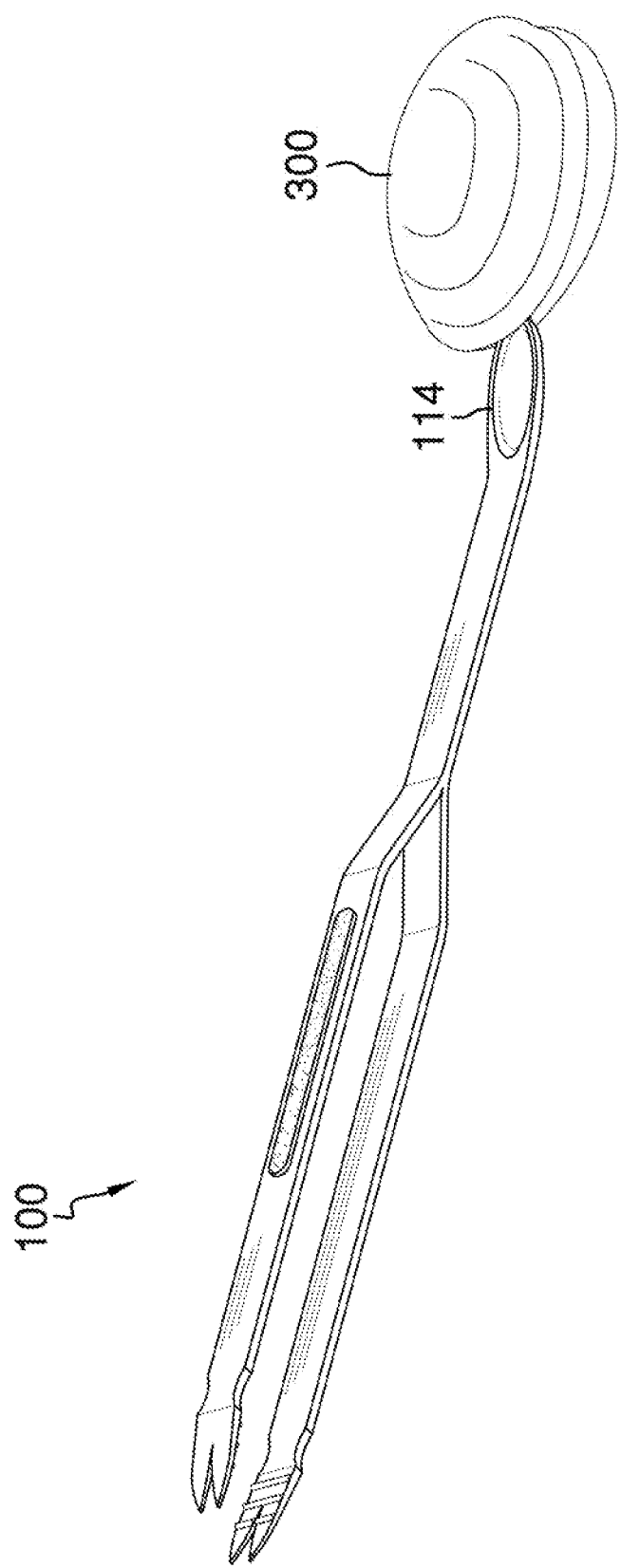
FIG. 4 illustrates a view of the seafood meat extraction tool wherein the pry member is being used to pry open a closed crustacean.
Figure 5:
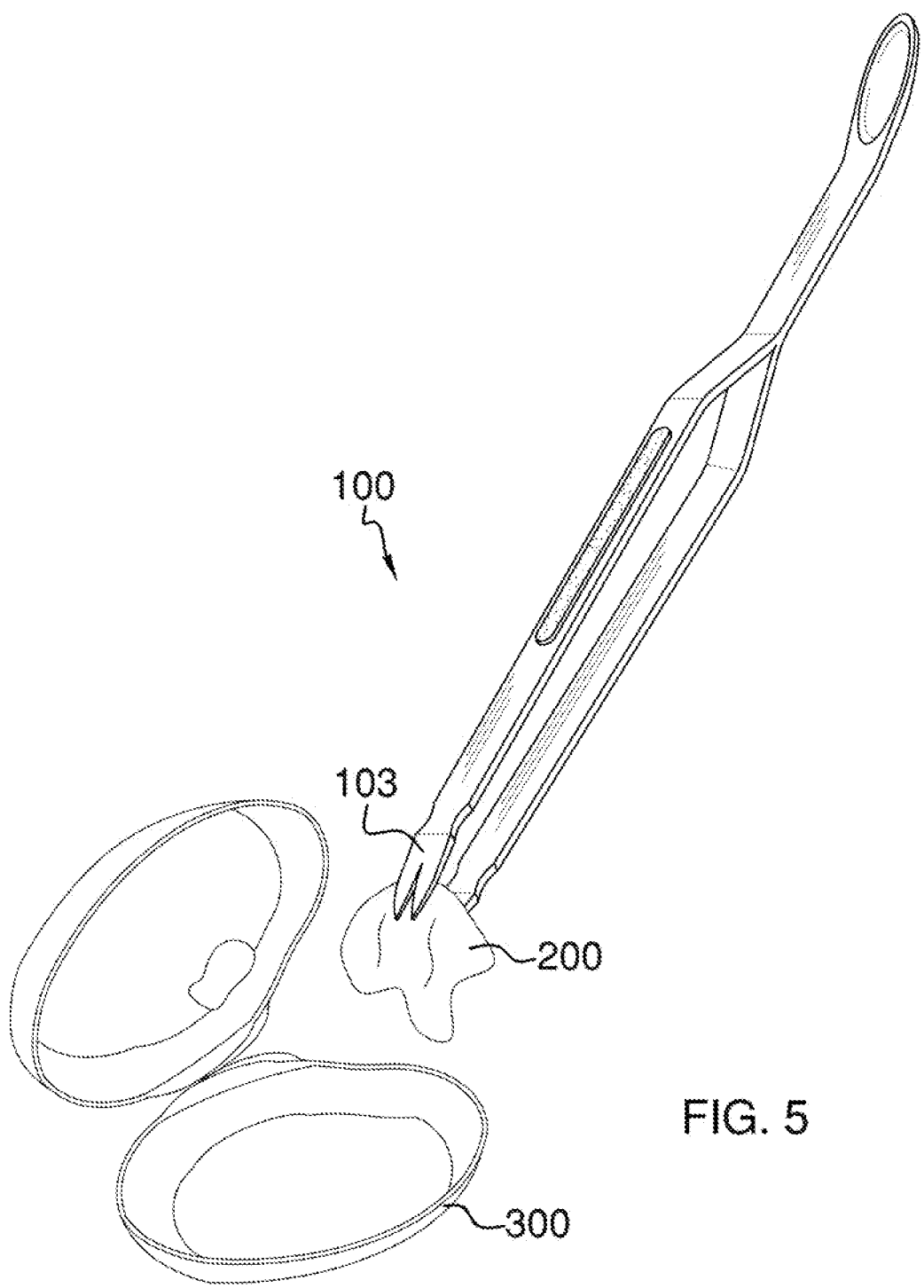
FIG. 5 illustrates a view of the elongated tongs being used to remove the meat from the opened crustacean.

The pry member 114 is included in order for the invention 100 to be used to pry open a closed crustacean 300 (see FIGS. 4-5). The pry member 114 is ideally used to open the closed crustacean 300, and upon which the pointed members 103 are manipulated in order to skewer and/or grab the meat 200 contained therein. Moreover, the pry member 114 is spoon-shaped such that the pry member 114 may be alternatively used to scoop out meat 200. Moreover, the pry member 114 may be used to serve meat 200 to the end user. Alternatively, it shall be noted that the pry member 114 may be used to pry out meat 200 that is unsuccessfully removed via the elongated tongs 103.

Figure 6:
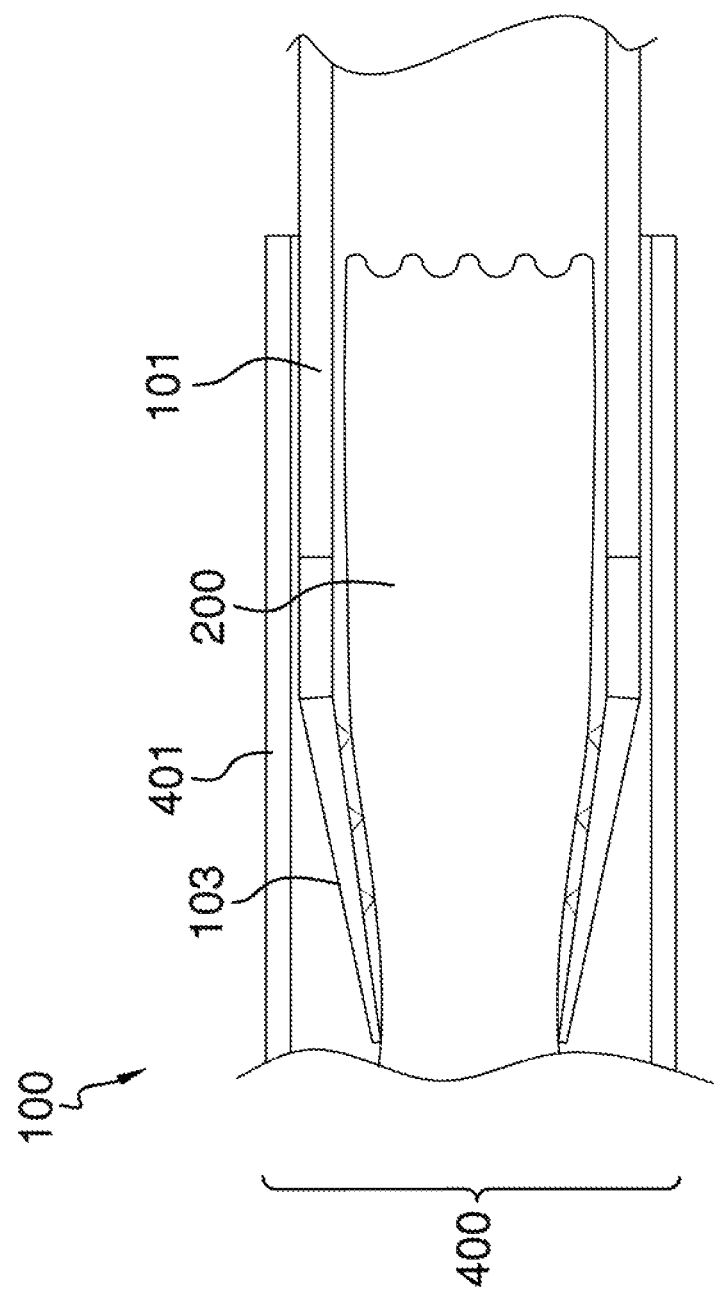
FIG. 6 illustrates a view of the elongated tongs being inserted into and used to grip meat from inside of a shell of a crab leg.

Referring to FIG. 6, the invention 100 may be used to remove meat 200 from a crab leg 400. The elongated tongs 101 are generally slim in profile, and enable the pointed members 103 to slide in between the meat 200 and the shell 401 of the crab leg 400.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A seafood meat extraction tool comprising:
  a pair of elongated members that are generally parallel with one another, and connect at a juncture, which imposes a biasing force such that the elongated tongs may be squeezed towards one another;
  wherein a handle member extends in an opposing direction with respect to the elongated tongs;
  wherein the elongated tongs each include a pointed member that is configured to grab and/or skewer meat;
  wherein the pair of elongated tongs are of equal in size and shape, and which are generally parallel with one another; wherein the elongated tongs are further defined with a distal end at which the pointed member extends inwardly at an angle;
  wherein the pointed member includes at least one sharpened point that is ideal for skewering meat thereon;
  wherein the pointed member is further defined with an inner surface that is adorned with at least one raised protuberance; wherein the raised protuberances of the pointed members face one another such that when in use, the raised protuberances add gripping value;

wherein the elongated tongs have a tong length, and connect at a juncture; wherein the elongated tongs are further defined with an outer surface that is provided with a non-slip member that provides a means with which to grab and manipulate the seafood meat extraction tool;

wherein the handle member that extends rearwardly from the juncture such that the elongated tongs extend forwardly; wherein the juncture forms a "Y" shape between the elongated tongs and the handle member; wherein the juncture forms an acute juncture angle with respect to the elongated tongs and the handle member; wherein the handle member is of an undefined length, and has the same width as the elongated tongs;

wherein the handle member includes a pry member that is opposite of the juncture; wherein the pry member forms a pry angle with respect to the handle member;

wherein the pry member is included in order for the seafood meat extraction tool to be used to pry open a closed crustacean; wherein the pry member is ideally used to open the closed crustacean, and upon which the pointed members are manipulated in order to skewer and/or grab the meat contained therein;

wherein the pry member is spoon-shaped;

wherein the meat extraction tool is used to remove meat from a crab leg; wherein the elongated tongs are generally slim in profile, and enable the pointed members to slide in between the meat and the shell of the crab leg.

2. A seafood meat extraction tool comprising:

a pair of elongated members that are generally parallel with one another, and connect at a juncture, which imposes a biasing force such that the elongated tongs may be squeezed towards one another;

wherein a handle member extends in an opposing direction with respect to the elongated tongs;

wherein the elongated tongs each include a pointed member that is configured to grab and/or skewer meat;

wherein the pair of elongated tongs are of equal in size and shape, and which are generally parallel with one another; wherein the elongated tongs are further defined with a distal end at which the pointed member extends inwardly at an angle;

wherein the pointed member includes at least one sharpened point that is ideal for skewering meat thereon; wherein the pointed member is further defined with an inner surface that is adorned with at least one raised protuberance; wherein the raised protuberances of the pointed members face one another such that when in use, the raised protuberances add gripping value;

wherein the elongated tongs have a tong length, and connect at a juncture; wherein the elongated tongs are further defined with an outer surface that is provided with a non-slip member that provides a means with which to grab and manipulate the seafood meat extraction tool;

wherein the handle member that extends rearwardly from the juncture such that the elongated tongs extend forwardly; wherein the juncture forms a "Y" shape between the elongated tongs and the handle member; wherein the juncture forms an acute juncture angle with respect to the elongated tongs and the handle member; wherein the handle member is of an undefined length, and has the same width as the elongated tongs;

wherein the handle member includes a pry member that is opposite of the juncture; wherein the pry member forms a pry angle with respect to the handle member;

wherein the pry member is included in order for the seafood meat extraction tool to be used to pry open a closed crustacean; wherein the pry member is ideally used to open the closed crustacean, and upon which the pointed members are manipulated in order to skewer and/or grab the meat contained therein;

wherein the pry member is spoon-shaped, and is used in conjunction with prying open a closed crustacean as a spoon to scoop out meat or to serve meat to a consumer end user;

wherein the meat extraction tool is used to remove meat from a crab leg; wherein the elongated tongs are generally slim in profile, and enable the pointed members to slide in between the meat and the shell of the crab leg.

* * * * *